(12) United States Patent
Oguma (10) Patent No.: US 7,590,838 B2
(45) Date of Patent: Sep. 15, 2009

(54) REMOTE BOOT METHOD AND MECHANISM, AND COMPUTER-READABLE STORAGE MEDIUM

(75) Inventor: Yukio Oguma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 11/190,970

(22) Filed: Jul. 28, 2005

(65) Prior Publication Data

US 2006/0212695 A1 Sep. 21, 2006

(30) Foreign Application Priority Data

Mar. 17, 2005 (JP) ............................. 2005-078011

(51) Int. Cl.
*G06F 9/24* (2006.01)
(52) U.S. Cl. ................................ 713/2; 713/1; 713/100
(58) Field of Classification Search ...................... 713/1, 713/2, 100
See application file for complete search history.

(56) References Cited

U.S. PATENT DOCUMENTS

| | | | |
|---|---|---|---|
| 6,175,918 B1 * | 1/2001 | Shimizu | 713/1 |
| 6,421,777 B1 | 7/2002 | Pierre-Louis et al. | |
| 6,691,160 B1 * | 2/2004 | Bradley | 709/222 |
| 6,735,692 B1 | 5/2004 | Murphrey et al. | |
| 7,302,559 B2 * | 11/2007 | Oguma | 713/1 |
| 2003/0005096 A1 * | 1/2003 | Paul et al. | 709/222 |
| 2003/0126242 A1 * | 7/2003 | Chang | 709/222 |
| 2004/0193867 A1 | 9/2004 | Zimmer et al. | |

FOREIGN PATENT DOCUMENTS

| | | |
|---|---|---|
| JP | 5-35489 | 2/1993 |
| JP | 6-259351 | 9/1994 |
| KR | 2002-0005963 | 1/2002 |
| WO | WO 03/090109 | 10/2003 |

OTHER PUBLICATIONS

Korean Patent Office Action, mailed Oct. 31, 2006, and issued in corresponding Korean Patent Application No. 10-2005-0076040.
Search Report dated Dec. 9, 2008 in corresponding European Application No. 05254738.7.

* cited by examiner

*Primary Examiner*—Dennis M Butler
(74) *Attorney, Agent, or Firm*—Staas & Halsey LLP (57) ABSTRACT

A remote boot method loads an image of an operating system from a file apparatus that is connected to a computer system to a main memory of the computer system and starting the operating system, and remotely specifies an image of a boot target from a system monitoring mechanism that monitors the entire computer system.

21 Claims, 5 Drawing Sheets

REMOTE BOOT METHOD AND MECHANISM, AND COMPUTER-READABLE STORAGE MEDIUM

BACKGROUND OF THE INVENTION

1. Field of the Invention

The present invention generally relates to remote boot methods and mechanisms and computer-readable storage media, and more particularly to a remote boot method and mechanism for carrying out a so-called boot process in a computer system to load an image of an operating system from a file apparatus that is connected to the computer system to a main memory of the computer system and to start the operating system, and to a computer-readable storage medium which stores a program for causing a computer to carry out such a boot process.

2. Description of the Related Art

In the computer system, the boot process which loads the image of the operating system from the file apparatus to the main memory and starts the operating system, is controlled by a boot firmware of the computer system.

Figure 1:
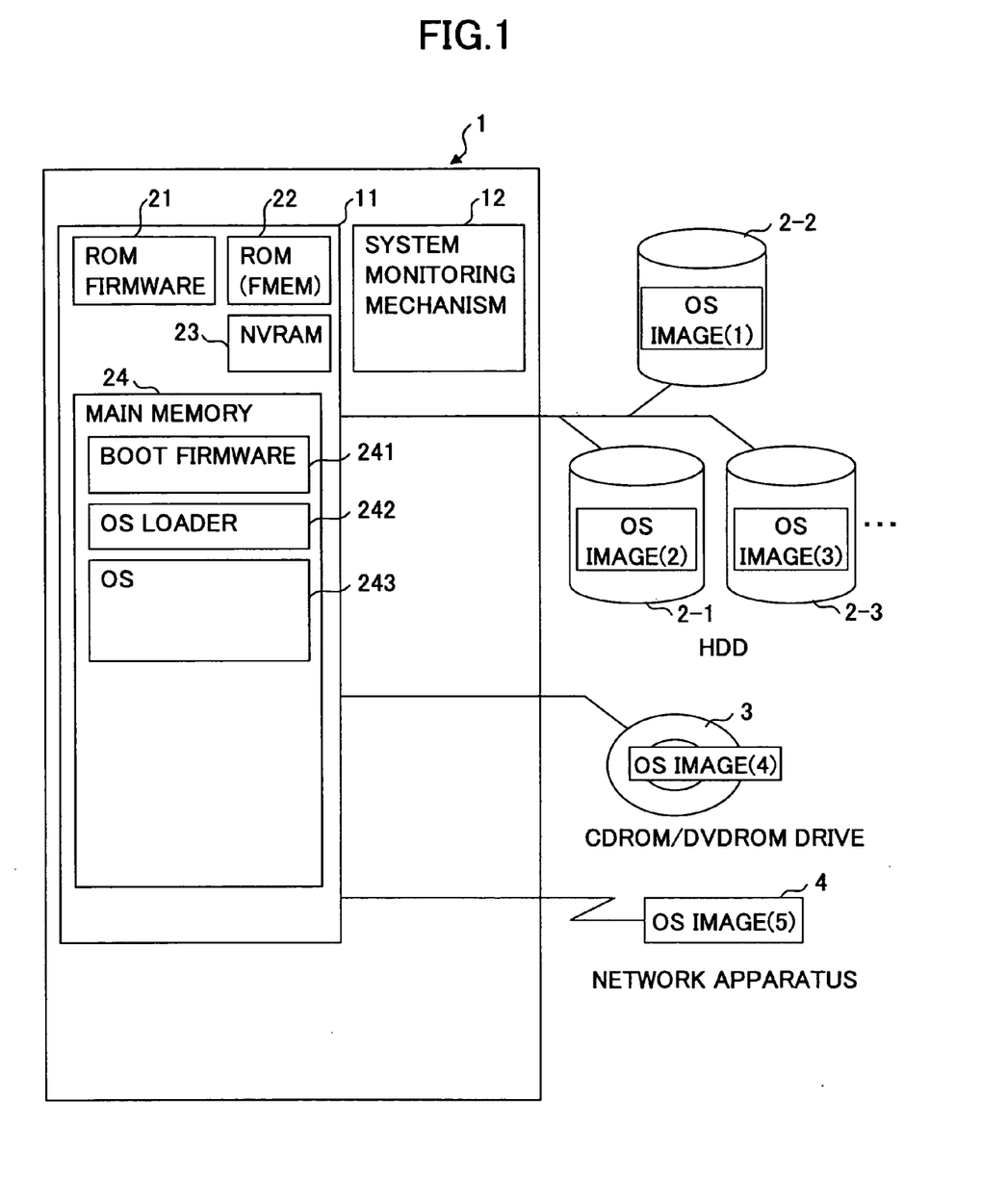
FIG. 1 is a diagram showing an important part of a conventional computer system.

FIG. 1 is a diagram showing an important part of a conventional computer system. In FIG. 1, a computer system 1 includes a main body part 11 and a system monitoring mechanism 12 that monitors the entire computer system 1. A plurality of Hard Disk Drives (HDDs) 2-1, 2-2, 2-3, . . . , a CDROM or DVDROM (CDROM/DVDROM) drive 3, and a network apparatus 4 are connected to the computer system 1, as file apparatuses. The main body part 11 includes a ROM firmware 21, a Read Only Memory (ROM) or Flash Memory (FMEM) 22, a Non-Volatile RAM (NVRAM) 23 and a main memory 24. In addition, the main memory 24 includes a boot firmware 241, an Operating System (OS) loader program (hereinafter simply referred to as an OS loader) 242 and an OS 243.

The ROM firmware 21 is written in a ROM or FMEM, and this ROM firmware 21 is started when the power of the computer system 1 is turned ON, to thereby execute a hardware analysis and initializing processes within the computer system 1. Thereafter, an image of the boot firmware that is compressed and stored in the ROM or FMEM 22 within the computer system 1 is located into the main memory 24, and the control is transferred to the boot firmware 241. The boot firmware 241 includes a driver program (hereinafter simply referred to as a driver) for controlling boot target apparatuses (file apparatuses) that are supported by the computer system 1, and executes the boot process by selecting the target apparatus that is to be actually booted, from the boot target apparatuses that are connected to the computer system 1, depending on preset boot information. Normally, the boot firmware 241 boots the OS loader 242 for booting the target OS 243. The boot firmware 241 does not need to be able to analyze the file system of the OS 243. Since the OS loader 242 that corresponds to the OS 243 can analyze the file system of the OS 243, the boot firmware 241 can recognize the location of the OS loader 242 in the boot target apparatus, and if this OS loader 242 can be booted, the OS 243 can thereafter be booted by this OS loader 242. In the computer system 1 shown in FIG. 1, the boot information is stored in the NVRAM 23. The boot target apparatus that is to be automatically booted when starting the computer system 1 is determined from the plurality of boot target apparatuses that are connected to the computer system 1, depending on the boot information that is stored in the NVRAM 23. The boot information that is stored in the NVRAM 23 includes a BootXXXX variable and a BootOrder variable, where "XXXX" denotes a hexadecimal number from "0000" to "FFFF". The BootXXXX variable includes device path information indicating a location where the boot target apparatus is connected to the computer system 1, and information related to a file position and a file name of the OS loader 242. The BootOrder variable specifies an order in which the boot target apparatuses indicated by the plurality of BootXXXX variables are to be booted. When the control is transferred to the boot firmware 241, the boot firmware 241 initializes various drivers for booting and carries out a probing process with respect to the HDDs 2-1, 2-2, 2-3, . . . that are connected to the computer system 1. Thereafter, the value of the portion "XXXX" of the BootXXXX variable is specified from the BootOrder variable of the NVRAM variables, and the boot target apparatus specified by the BootXXXX variable and the OS loader 242 are booted.

Accordingly, the following functions f1) through f3) are realized by the boot firmware 241.

f1) A function of using drivers thereof for controlling the boot target apparatuses such as the HDDs 2-1, 2-2, 2-3, . . . , the CDROM/DVDROM drive 3 and the network apparatus 4, and booting the OS loaders 242 stored in the boot target apparatuses;

f2) A function of storing the boot information, such as the device path information of the boot target apparatus and information of the image of the target OS, in the NVRAM 23; and f3) A function of reading the boot information stored in the NVRAM 23, and selecting the boot target apparatus based on a boot priority order.

According to the functions f1) through f3) described above, the boot process of the OS 243 by the boot firmware 241 may be regarded as functions to determine the boot target apparatus based on the boot information that is preset in the NVRAM 23 and to boot the OS loader 242. But in addition, the boot process of the OS 243 by the boot firmware 241 includes a so-called remote boot function which temporarily executes a boot process from a boot apparatus different from the boot information that is preset in the NVRAM 23, only for the next boot process, based on information received from the system monitoring mechanism 12.

Figure 2:
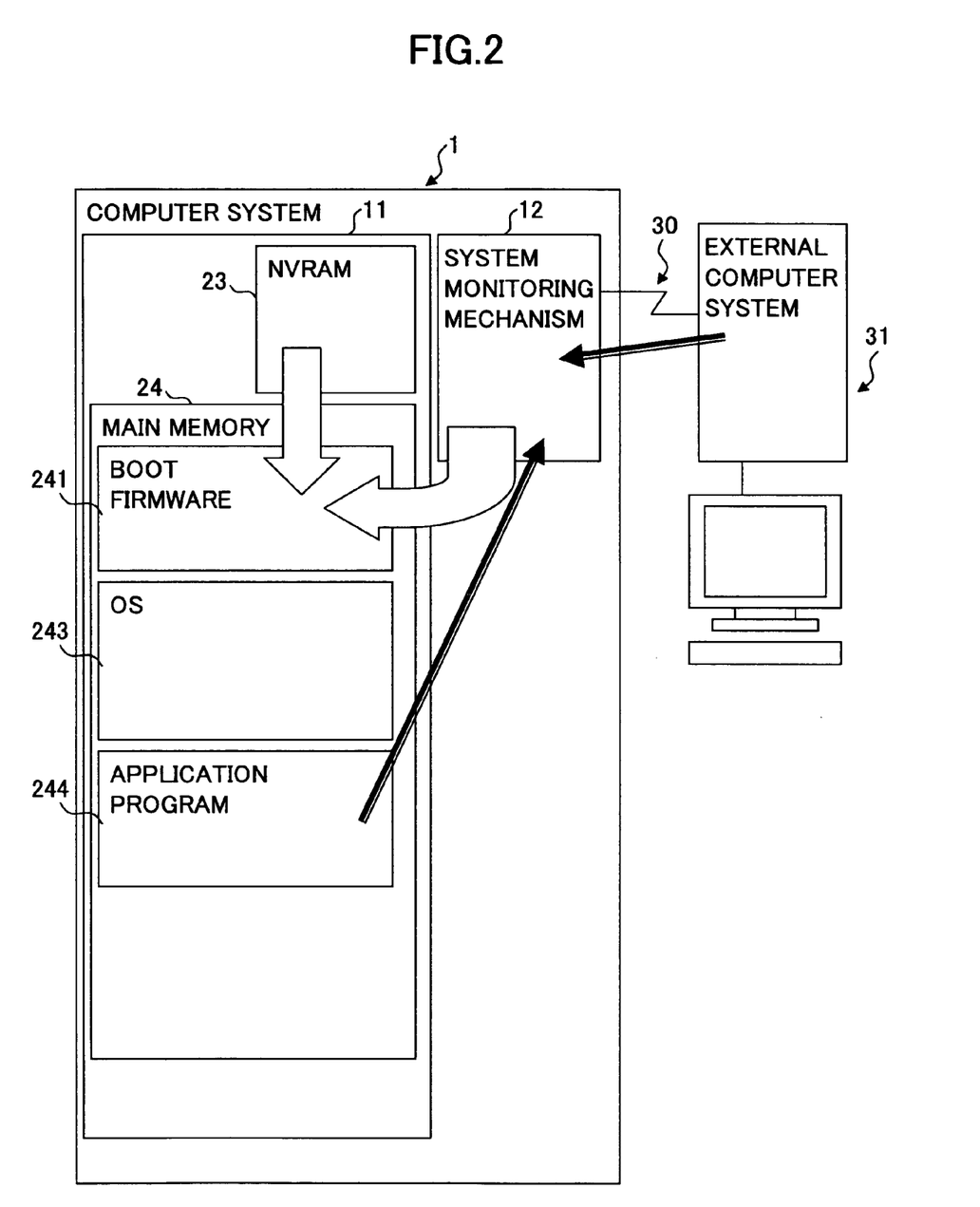
FIG. 2 is a diagram for explaining a path with which a boot firmware acquires boot information.

FIG. 2 is a diagram for explaining a path with which the boot firmware 241 acquires the boot information. In the normal boot process, the boot information is acquired from the NVRAM 23 that is managed by the boot firmware 241. In case where the boot information also exists in the system monitoring mechanism 12, the boot target apparatus is determined depending on the boot information from the system monitoring mechanism 12, regardless of the boot information from the NVRAM 23. The boot information in the system monitoring mechanism 12 may be specified by an application program 244 that is under the control of the OS operated in the computer system 1 or, specified by an external computer system 31 that is connected to the system monitoring mechanism 12 via a network 30.

For example, a Japanese Laid-Open Patent Application No. 5-35489 proposes a method of loading an initial program in a computer work station that is connected to a LAN or the like, by determining a generation source of an initial program load control logic. In addition, a Japanese Laid-Open Patent Application No. 6-259351 proposes a method of automatically starting an auxiliary system when a failure is generated in an information processing apparatus.

In the computer system 1 described above, it is possible to specify a temporary boot from the application program 244 or the external computer 31, by a remote boot control via the system monitoring mechanism 12, regardless of the boot information set in the NVRAM 23 that is managed by the boot firmware 241. However, although the boot firmware 241 can flexibly set the boot information depending on the system structure by setting detailed boot information in the NVRAM 23, there was a problem in that the booting can only be specified from particular HDDs, CDROM/DVDROM drives and network apparatuses because a reference cannot be made to the information that is flexibly set in the NVRAM 23 when specifying the boot target apparatus via the system monitoring mechanism 12. In other words, when storing the boot information in the NVRAM 23, even an apparatus that is connected via an interface that is not provided as an on-board interface of the target computer system 1 may be freely set since the device path information of the boot target apparatus can be freely set as the boot information, and the boot path may be defined flexibly depending on the system structure. However, the boot path cannot be freely specified in such a manner via the system monitoring mechanism 12.

SUMMARY OF THE INVENTION

Accordingly, it is a general object of the present invention to provide a novel and useful remote boot method and mechanism and computer-readable storage medium, in which the problems described above are suppressed.

Another and more specific object of the present invention is to provide a remote boot method, a remote boot mechanism and a computer-readable storage medium, which can remotely specify an image of an Operating System (OS) that is a boot target, from a system management mechanism that manages the entire computer system.

Still another object of the present invention is to provide a remote boot method comprising the steps of loading an image of an operating system from a file apparatus that is connected to a computer system to a main memory of the computer system and starting the operating system; and remotely specifying an image of a boot target from a system monitoring mechanism that monitors the entire computer system. According to the remote boot method of the present invention, it is possible to remotely specify an image of an operating system that is a boot target, from a system management mechanism that manages the entire computer system.

A further object of the present invention is to provide a remote boot mechanism comprising a part configured to load an image of an operating system from a file apparatus that is connected to a computer system to a main memory of the computer system and starting the operating system; and a part configured to remotely specify an image of a boot target from a system monitoring mechanism that monitors the entire computer system. According to the remote boot mechanism of the present invention, it is possible to remotely specify an image of an operating system that is a boot target, from a system management mechanism that manages the entire computer system.

Another object of the present invention is to provide a computer-readable storage medium which stores a program for causing a computer to carry out a remote boot process, the program comprising a procedure causing the computer to load an image of an operating system from a file apparatus that is connected to a computer system to a main memory of the computer system and starting the operating system; and a procedure causing the computer to remotely specify an image of a boot target from a system monitoring mechanism that monitors the entire computer system. According to the computer-readable storage medium of the present invention, it is possible to remotely specify an image of an operating system that is a boot target, from a system management mechanism that manages the entire computer system.

Other objects and further features of the present invention will be apparent from the following detailed description when read in conjunction with the accompanying drawings.

DESCRIPTION OF THE PREFERRED EMBODIMENTS

A description will be given of embodiments of the remote boot method, remote boot mechanism and computer-readable storage medium according to the present invention, by referring to FIGS. 3 through 5.

According to the remote boot method, the remote boot mechanism and the computer-readable storage medium of the present invention, when an image of an Operating System (OS) that is a boot target exists in a plurality of file apparatuses and a control is to be carried out to boot one of the boot target images, this one boot target image is remotely specified from a system management mechanism that manages the entire computer system.

The computer-readable storage medium stores a program for causing a computer to carry out such a remote boot method and/or cause the computer to function as such a remote boot mechanism, and this program may be stored in any suitable recording medium capable of storing the program in a computer-readable manner.

Figure 3:
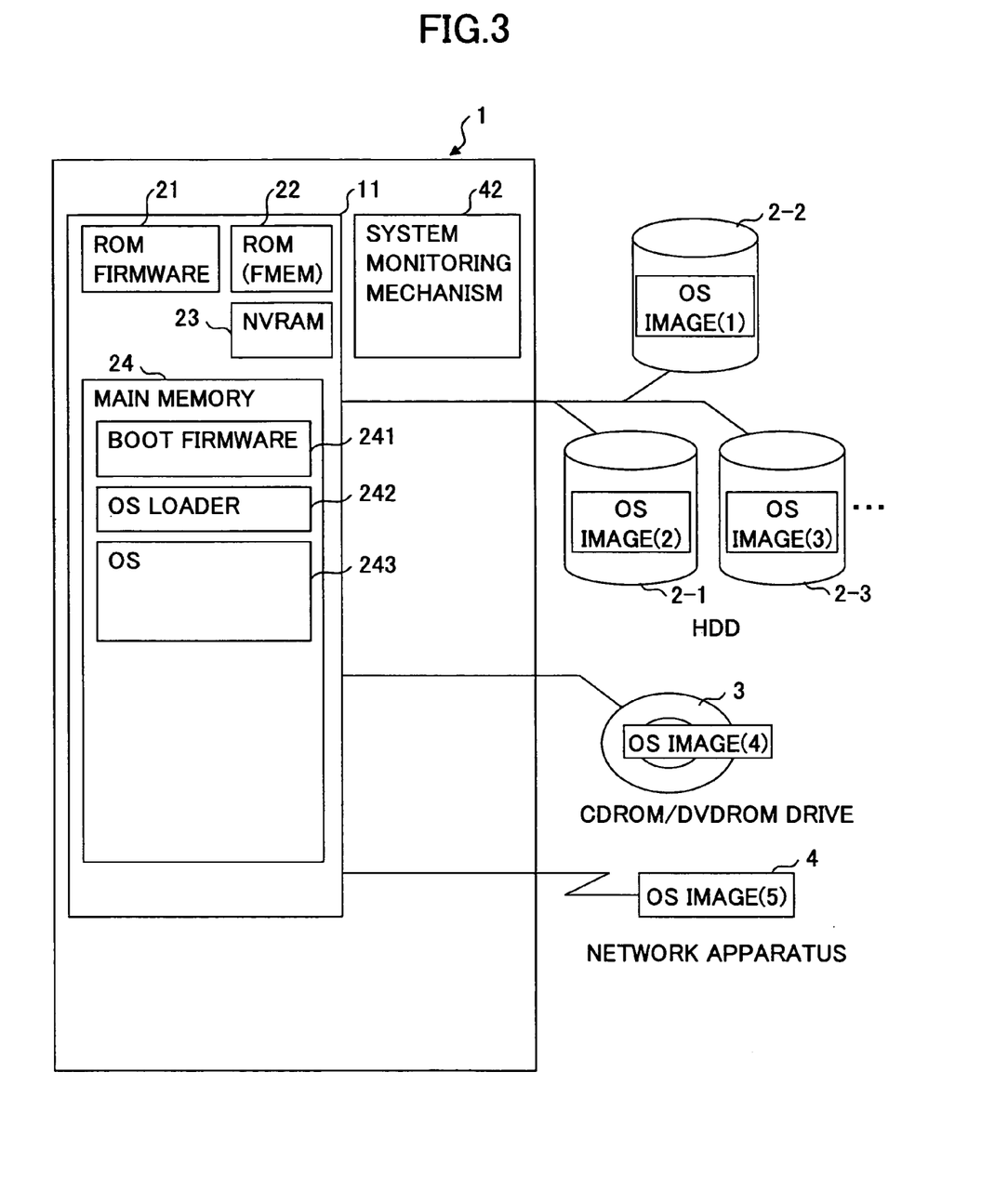
FIG. 3 is a diagram showing a computer system applied with an embodiment of the present invention.

FIG. 3 is a diagram showing a computer system applied with an embodiment of the present invention. In FIG. 3, those parts which are the same as those corresponding parts in FIG. 1 are designated by the same reference numerals, and a description thereof will be omitted. In FIG. 3, a computer system 1 includes a main body part 11, and a system monitoring mechanism 42 that monitors the entire computer system 1. A plurality of Hard Disk Drives (HDDs) 2-1, 2-2, 2-3, . . . , a CDROM or DVDROM (CDROM/DVDROM) drive 3, and a network apparatus 4 are connected to the computer system 1, as file apparatuses. The main body part 11 includes a ROM firmware 21, a Read Only Memory (ROM) or Flash Memory (FMEM) 22, a Non-Volatile RAM (NVRAM) 23 and a main memory 24. In addition, the main memory 24 includes a boot firmware 241, an Operating System (OS) loader program (hereinafter simply referred to as an OS loader) 242 and an OS 243.

The ROM firmware 21 is written in a ROM or FMEM, and this ROM firmware 21 is started when the power of the computer system 1 is turned ON, to thereby execute a hardware analysis and initializing processes within the computer system 1. Thereafter, an image of the boot firmware that is compressed and stored in the ROM or FMEM 22 within the computer system 1 is located into the main memory 24, and the control is transferred to the boot firmware 241. The boot firmware 241 includes a driver program (hereinafter simply referred to as a driver) for controlling boot target apparatuses (file apparatuses) that are supported by the computer system 1, and executes the boot process by selecting the target apparatus that is to be actually booted, from the boot target apparatuses that are connected to the computer system 1, depending on preset boot information. Normally, the boot firmware 241 boots the OS loader 242 for booting the target OS 243. The boot firmware 241 does not need to be able to analyze the file system of the OS 243. Since the OS loader 242 that corresponds to the OS 243 can analyze the file system of the OS 243, the boot firmware 241 can recognize the location of the OS loader 242 in the boot target apparatus, and if this OS loader 242 can be booted, the OS 243 can thereafter be booted by this OS loader 242.

In the computer system 1 shown in FIG. 3, the boot information is stored in the NVRAM 23. The boot target apparatus that is to be automatically booted when starting the computer system 1 is determined from the plurality of boot target apparatuses that are connected to the computer system 1, depending on the boot information that is stored in the NVRAM 23. The boot information that is stored in the NVRAM 23 includes a BootXXXX variable, a BootOrder variable, and a BootNext variable, where "XXXX" denotes a hexadecimal number from "0000" to "FFFF". The BootXXXX variable includes device path information indicating a location where the boot target apparatus is connected to the computer system 1, and information related to a file position and a file name of the OS loader 242. The BootOrder variable specifies an order in which the boot target apparatuses indicated by the plurality of BootXXXX variables are to be booted. The BootNext variable normally does not exist. But when the BootNext variable exists, the boot target apparatus that is specified by the BootXXXX variable indicated by the number set in the BootNext variable is booted, regardless of the BootOrder variable. When the control is transferred to the boot firmware 241, the boot firmware 241 initializes various drivers for booting and carries out a probing process with respect to the HDDs 2-1, 2-2, 2-3, . . . that are connected to the computer system 1. Thereafter, the value of the portion "XXXX" of the BootXXXX variable is specified from the BootOrder variable of the NVRAM variables, and the boot target apparatus specified by the BootXXXX variable and the OS loader 242 are booted.

Accordingly, the following functions f11) through f13) are realized by the boot firmware 241.

f11) A function of using drivers thereof for controlling the boot target apparatuses such as the HDDs 2-1, 2-2, 2-3, . . . , the CDROM/DVDROM drive 3 and the network apparatus 4, and booting the OS loaders 242 stored in the boot target apparatuses;

f12) A function of storing the boot information, such as the device path information of the boot target apparatus and information of the image of the target OS, in the NVRAM 23; and f13) A function of reading the boot information stored in the NVRAM 23, and selecting the boot target apparatus based on a boot priority order.

According to the functions f11) through f13) described above, the boot process of the OS 243 by the boot firmware 241 may be regarded as functions to determine the boot target apparatus based on the boot information that is preset in the NVRAM 23 and to boot the OS loader 242. But in addition, the boot process of the OS 243 by the boot firmware 241 includes a so-called remote boot function which temporarily executes a boot process from a boot apparatus different from the boot information that is preset in the NVRAM 23, only for the next boot process, based on information received from the system monitoring mechanism 42.

Figure 4:
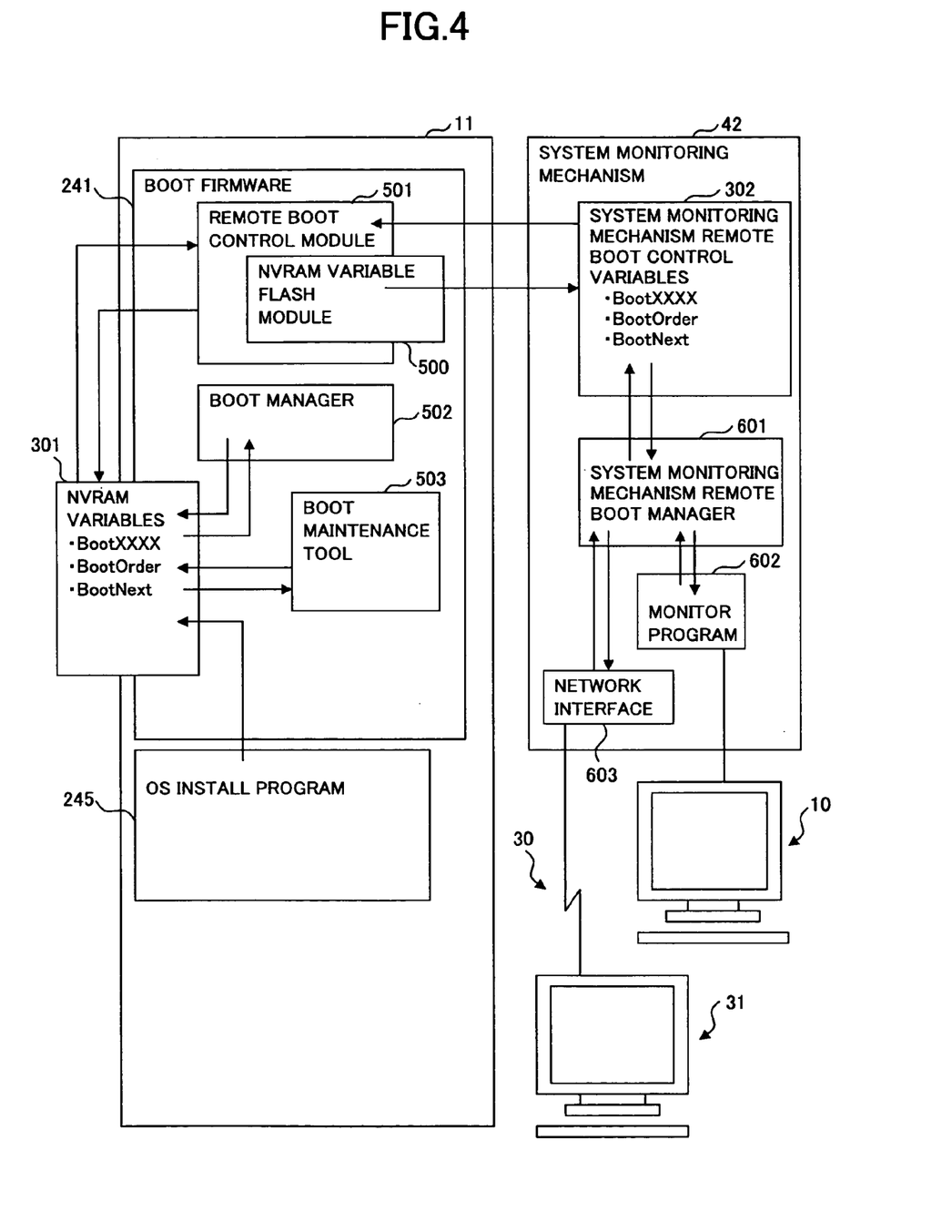
FIG. 4 is a system block diagram showing an important part of the embodiment of the present invention.

FIG. 4 is a system block diagram showing an important part of this embodiment of the present invention. As shown in FIG. 4, the main memory 24 includes the boot firmware 241 and an OS install program 245. The boot firmware 241 includes a remote boot control module 501 including an NVRAM variable flash module 500, a boot manager 502, a boot maintenance tool 503, and NVRAM variables 301. The system monitoring mechanism 42 includes a system monitoring mechanism remote boot manager 601, a monitor program 602, a network interface 603, and system monitoring mechanism remote boot control variables 302.

The monitor program 602 of the system monitoring mechanism 42 is connected to at least a part 10 of the main body part 11 within the computer system 1. For example, the part 10 corresponds to an output function of a display part. Information monitored by the monitor program 602 can be output to this part 10. The network interface 603 is connectable to the other computer system 31 via the network 30. The system monitoring mechanism remote boot manager 601 specifies (or instructs) a remote boot using the system monitoring mechanism remote boot control variables 302, and also manages the remote boot, in response to a request or instruction received from the part 10 or the other computer system 31.

The remote boot control module 501 of the boot firmware 241 controls the remote boot that is specified (or instructed) from the system monitoring mechanism 42, and the NVRAM variable flash module 500 copies the NVRAM variables 301 to the system monitoring mechanism remote boot control variables 302 within the system monitoring mechanism 42 when the NVRAM variables 301 are updated. The boot manager 502 manages the boot by the boot firmware 241, including the remote boot. The boot maintenance tool 503 carries out a boot maintenance including updating of the NVRAM variables 301. The OS install program 245 installs the image of the OS to the HDDs 2-1, 2-2, 2-3, . . . and the like, and updates the NVRAM variables 301.

In this embodiment, the BootXXXX variable, the BootOrder variable and the BootNext variable are all included not only in the NVRAM variables 301 that are managed by the boot firmware 241, but also in the system monitoring mechanism remote boot control variables 302 that are managed by the system monitoring mechanism 42, so that the boot target apparatus managed by the boot firmware 241 can also be specified by the remote boot that is specified from the remote monitoring mechanism 42. The following controls c1) through c7) are made in order to maintain coherency of the boot information stored in the NVRAM 23 and the boot information stored in the remote monitoring mechanism 42.

c1) The BootXXXX variable is made modifiable only at the NVRAM variables 301 by the boot maintenance tool 503 or the OS install program 245, and non-modifiable at the system monitoring mechanism remote boot control variables 302.

c2) The remote boot control module 501 confirms whether or not all of the BootXXXX variables of the NVRAM variables 301 and the BootXXXX variables of the system monitoring mechanism remote boot control variables 302 perfectly match when the boot firmware 241 is started, and enables a boot depending on the remote boot that is specified only if the BootXXXX variables perfectly match. If the BootXXXX variables do not perfectly match even when the remote boot is specified by the system monitoring mechanism remote boot manager 601 of the system monitoring mechanism 42, the remote boot control module 501 invalidates the remote boot that is specified, notifies to the system monitoring mechanism 42 an error message indicating that the remote boot that is specified has been invalidated since the boot information has been modified, and executes a normal boot process by the boot firmware 241.

c3) The BootOrder variable is made modifiable at both the NVRAM variables 301 and the system monitoring mechanism remote boot control variables 302. When the remote boot is specified from the system monitoring mechanism 42 and the remote boot control module 501 confirms that the coherency of the BootXXXX variables is maintained, the BootOrder variable and the BootNext variable of the system monitoring mechanism remote boot control variables 302 are copied to the NVRAM variables 301. In addition, with regard to the BootNext variable, after the BootXXXX variable of the boot target apparatus is determined, the BootNext variable if it exists in the NVRAM variables 301 is deleted regardless of whether or not the BootNext variable exists in the system monitoring mechanism remote boot control variables 302 (step S11 shown in FIG. 5 which will be described later). Accordingly, in this case, the BootOrder variable at the time when the remote boot is specified becomes valid, and it is possible to modify the priority order of the boot by the boot manager 502 from the system monitoring mechanism 42 (that is, the system monitoring mechanism remote boot manager 601).

c4) The BootNext variable can be created at both the NVRAM variables 301 and the system monitoring mechanism remote boot control variables 302. When the remote boot is specified from the system monitoring mechanism 42 and the remote boot control module 501 confirms that the coherency of the BootXXXX variables is maintained, the BootOrder variable and the BootNext variable of the system monitoring mechanism remote boot control variables 302 are copied to the NVRAM variables 301. In addition, with regard to the BootNext variable, the BootNext variable if it exists in the NVRAM variables 301 is deleted regardless of whether or not the BootNext variable exists in the system monitoring mechanism remote boot control variables 302. Accordingly, in this case, the BootNext variable at the time when the remote boot is specified becomes valid, and it is possible to temporarily specify the boot target apparatus from the system monitoring mechanism 42 (that is, the system monitoring mechanism remote boot manager 601).

c5) In both cases where the remote boot is specified and not specified from the system monitoring mechanism 42, the boot firmware 241 carries out the boot process according to the BootXXXX variable, the BootOrder variable and the BootNext variable of the NVRAM variables 301, similarly to the conventional control. When the remote boot is specified and the coherency of the BootXXXX variables is maintained, the BootOrder variable and the BootNext variable are replaced by those that are specified by the remote boot, and the boot process is executed depending on the remote boot that is specified.

c6) Generally, when specifying the remote boot, only the BootNext variable is usually set. Hence, the boot target apparatus of the next boot process can be specified temporarily, without modifying the boot information of the NVRAM variables 301 that are managed by the boot firmware 241.

c7) When the boot target apparatus is determined, the boot firmware 241 deletes the BootNext variable if it exists in the NVRAM variables 301. The number of the BootXXXX variable indicating the boot target apparatus that is determined is set in a BootCurrent variable which is a memory variable, and this BootCurrent variable is notified to the system monitoring mechanism 42. The BootCurrent variable is managed by the boot firmware 241, but is not an NVRAM variable 301, and thus, the BootCurrent variable is lost when the power of the computer system 1 is turned OFF. By checking the BootCurrent variable after the OS 243 is started, it is possible to judge by the OS 243 which boot target apparatus has been booted.

Figure 5:
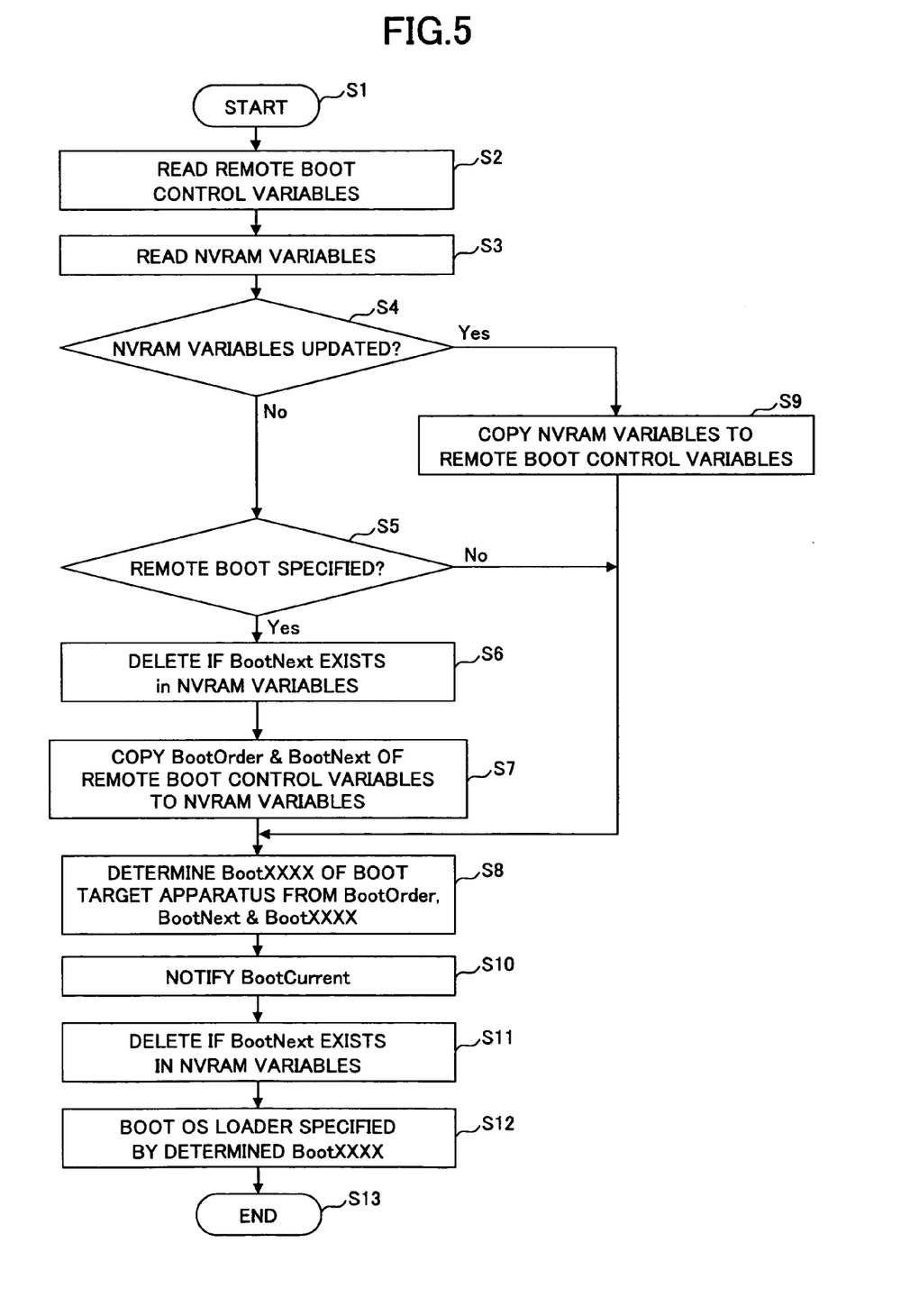
FIG. 5 is a flow chart for explaining an operation of the embodiment of the present invention.

FIG. 5 is a flow chart for explaining an operation of this embodiment of the present invention. The process shown in FIG. 5 is executed by the remote boot control module 501 of the boot firmware 241. In FIG. 5, when the process of the remote boot control module 501 is started in a step S1, a step S2 reads the system monitoring mechanism remote boot control variables 302 from the system monitoring apparatus 42. A step S3 reads the NVRAM variables 301 from the NVRAM 23. A step S4 decides whether or not the boot variables (BootXXXX variable, BootOrder variable and BootNext variable) of the NVRAM variables 301 have been updated. If the decision result in the step S4 is NO, a step S5 decides whether or not a remote boot is specified from the system monitoring mechanism 42.

If the decision result in the step S5 is YES, a step S6 deletes the BootNext variable if it is included in the NVRAM variables 301. A step S7 copies the BootOrder variable and the BootNext variable included in the system monitoring mechanism remote boot control variables 302 to the NVRAM variables 301. A step S8 determines the BootXXXX variable of the boot target apparatus based on the BootXXXX variable, the BootOrder variable and the BootNext variable of the NVRAM variables 301. If the decision result in the step S5 is NO, the process advances to a step S8.

In the step S5, when the OS 243 is installed by the OS install program 245 or the boot maintenance is carried out by the boot maintenance tool 503, and the reboot is not executed and the remote boot is specified in a state where the boot variables of the NVRAM variables 301 are updated, the remote boot is invalidated in this case, and the decision result in the step S5 becomes NO.

On the other hand, if the decision result I the step S4 is YES, a step S9 copies the NVRAM variables 301 to the system monitoring mechanism remote boot control variables 302 within the system monitoring mechanism 42 by a flash process, and the process advances to the step S8.

After the step S8, a step S10 notifies the BootCurrent variable to the system monitoring mechanism 42. A step S11 deletes the BootNext variable if this BootNext variable is included in the NVRAM variables 301. A step S12 boots the OS loader 242 that is specified by the BootXXXX variable that is determined in the step S8, and the process ends in a step S13.

In the embodiment described above, when the BootXXXX variable, the BootOrder variable and the BootNext variable exist as the NVRAM variables 301 and the remote boot is specified, the BootOrder variable and the BootNext variable of the system monitoring mechanism remote boot control variables 302 are copied to the NVRAM variables 301, so that in the subsequent processes the bootXXXX variable of the boot target apparatus is determined from the bootXXXX variable, the BootOrder variable and the BootNext variable of the NVRAM variables 301 without being aware of the remote boot that is specified from the system monitoring mechanism 42. But instead, it is possible to carry out a control by the remote boot control module 501, as in each of modifications described hereunder.

In a first modification, when the remote boot is specified, the BootOrder variable of the system monitoring mechanism remote boot control variables 302 is copied to the NVRAM variables 301 only if this BootOrder variable is different from the BootOrder variable of the NVRAM variables 301. With regard to the BootNext variable, a BootNextMemory variable is newly created as a memory variable, and not the NVRAM variables 301, if the BootNext variable exists in the system monitoring mechanism remote control variables 302, and the value of the BootNext variable of the system monitoring mechanism remote boot control variables 302 is copied to the BootNextMemory variable.

In the boot process carried out thereafter, the existence of the BootNextMemory variable is checked, and if the BootNextMemory variable exists, the BootXXXX variable of the NVRAM variables 301 specified by the value set in the BootNextMemory variable is regarded as the BootXXXX variable of the boot target apparatus. In a case where the NVRAM 301 is stored in a storage apparatus having a limit to the number of times the updating may be made, such as the flash memory, it is necessary to minimize unnecessary updating processes with respect to the NVRAM variables 301. According to this first modification, if the boot specified using the system monitoring mechanism remote boot control variables 302 is only due to the BootNext variable, it is sufficient to create the BootNextMemory variable using the main memory 24 of the computer system 1 as the storage apparatus, and not the BootNext variable of the system monitoring mechanism remote boot control variables 302, thereby making it possible to suppress the updating with respect to the NVRAM variables 301.

In a second modification, the remote boot that is specified is limited to only the process at the time of the next boot, so as to guarantee the suppression of the unnecessary updating processes with respect to the NVRAM variables 301. In this case, the system monitoring mechanism remote boot control variables 302 do not need to include the BootOrder variable, and only need to include the BootNext variable. Similarly as in the case of the first modification described above, the BootNextMemory variable is newly created as the memory variable, and not the NVRAM variables 301, if the BootNext variable exists in the system monitoring mechanism remote control variables 302, and the value of the BootNext variable of the system monitoring mechanism remote boot control variables 302 is copied to the BootNextMemory variable. Hence, in the boot process carried out thereafter, the existence of the BootNextMemory variable is checked, and if the BootNextMemory variable exists, the BootXXXX variable of the NVRAM variables 301 specified by the value set in the BootNextMemory variable is regarded as the BootXXXX variable of the boot target apparatus. Since the remote boot is specified using only the BootNext variable, it is possible to suppress the updating with respect to the NVRAM variables 301 when the remote boot is specified by the process of this modification.

In the embodiment described above, the BootXXXX variable is modifiable at the NVRAM variables 301, and the remote boot that is specified is validated only when the coherency of the BootXXXX variables of the NVRAM variables 301 and the system monitoring mechanism remote boot control variables 302 is confirmed. But according to a third modification, in the computer system 1 in which the remote boot is specified using only the BootNext variable, the value of a specific BootXXXX variable is fixedly set with respect to a specific boot target apparatus. Hence, when the BootXXXX variable that is fixedly set in this manner in the computer system 1 is specified by the BootNext variable, this third modification validates the BootNext variable that is specified in the remote boot, regardless of whether or not the coherency of the BootXXXX variables is maintained.

In a fourth modification, the BootXXXX variable that may be specified by the BootNext variable in the remote boot is limited to the BootXXXX variable that is fixedly set in the computer system 1, so that it is unnecessary to check or confirm the coherency of the BootXXXX variables of the NVRAM variables 301 and the system monitoring mechanism remote boot control variables 302. In this case, although it is difficult to flexibly cope with the modification of the BootXXXX variable of the NVRAM variables 301, it is possible to effectively reduce the processing time depending on the environment, such as under an environment where the boot target apparatuses that are connected to the computer system 1 are limited to a certain extent.

Therefore, the present invention is suited for application to computer systems that carry out the so-called boot process in which the image of the operating system is loaded from the file apparatus that is connected to the computer system to the main memory of the computer system and the operating system is started.

This application claims the benefit of a Japanese Patent Application No. 2005-078011 filed Mar. 17, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A remote boot method comprising the steps of:
    loading an image of an operating system from a first file apparatus that is coupled to a computer system to a main memory of the computer system and starting the operating system;
    remotely specifying an image of a second file apparatus that is coupled to the computer system, as an image of a boot target, from a system monitoring mechanism of the computer system, instead of specifying the image of the second file apparatus from a boot firmware; and
    including boot information in variables managed by the boot firmware and the system monitoring mechanism, in order to specify the second file apparatus that is the boot target and is managed by the boot firmware by a remote boot specified from the system monitoring mechanism,
    wherein the boot information includes device path information indicating a location where the second file apparatus is coupled to the computer system, and information related to a file position and a file name of an operating system loader, and
    wherein the boot firmware and the operating system loader are located into the main memory.

2. The remote boot method as claimed in claim 1, further comprising the steps of:
    including the boot information not only in NVRAM variables that are managed by the boot firmware but also in system monitoring mechanism remote boot control variables that are managed by the system monitoring mechanism, in order to specify the second file apparatus.

3. The remote boot method as claimed in claim 2, wherein:
    the boot information includes a BootXXXX variable, a BootOrder variable, and a BootNext variable, where "XXXX" denotes a hexadecimal number from "0000" to "FFFF",
    the BootXXXX variable includes the device path information, the BootOrder variable specifies an order in which a plurality of second file apparatuses that are boot targets and indicated by the plurality of BootXXXX variables are to be booted, and the BootNext variable, when it exists, indicates that the second file apparatus specified by the BootXXXX variable indicated by a number set in the BootNext variable is to be booted, regardless of the BootOrder variable.

4. The remote boot method as claimed in claim 3, wherein the BootXXXX variable is modifiable by a boot maintenance tool of the boot firmware only at the NVRAM variables, and non-modifiable at the system monitoring mechanism remote boot control variables.

5. The remote boot method as claimed in claim 3, further comprising the steps of:

enabling a boot specified the remote boot only if all of the BootXXXX variables of the NVRAM variables and the BootXXXX variables of the system monitoring mechanism remote boot control variables perfectly match.

6. The remote boot method as claimed in claim 3, wherein:

the BootOrder variable is modifiable at both the NVRAM variables and the system monitoring mechanism remote boot control variables, the BootOrder variable and the BootNext variable of the system monitoring mechanism remote boot control variables are copied to the NVRAM variables when a remote boot is specified from the system monitoring mechanism and it is confirmed that a coherency of the BootXXXX variables is maintained, and the BootNext variable existing in the NVRAM variables is deleted regardless of whether or not the BootNext variable exists in the system monitoring mechanism remote boot control variables.

7. The remote boot method as claimed in claim 3, wherein:

the BootNext variable is creatable at both the NVRAM variables and the system monitoring mechanism remote boot control variables, the BootOrder variable and the BootNext variable of the system monitoring mechanism remote boot control variables are copied to the NVRAM variables when a remote boot is specified from the system monitoring mechanism and it is confirmed that a coherency of the BootXXXX variables is maintained, and the BootNext variable existing in the NVRAM variables is deleted regardless of whether or not the BootNext variable exists in the system monitoring mechanism remote boot control variables.

8. The remote boot method as claimed in claim 3, wherein a remote boot is specified by setting only the BootNext variable, and one of the plurality of second file apparatuses that is the boot target of a next boot process is specified temporarily without modifying the boot information of the NVRAM variables that are managed by the boot firmware.

9. The remote boot method as claimed in claim 3, further comprising the steps of:

deleting the BootNext variable existing in the NVRAM variables after determining the file apparatus that is the boot target by the boot firmware; and setting a number of the BootXXXX variable indicating the determined file apparatus that is the boot target to a BootCurrent variable that is a memory variable.

10. A computer-implemented remote boot mechanism, comprising:

a computer system configured to utilize instructions, stored on a computer-readable medium, having:

a part configured to load an image of an operating system from a first file apparatus that is coupled to the computer system to a main memory of the computer system and starting the operating system;

a part configured to remotely specify an image of a second file apparatus that is coupled to the computer system, as an image of a boot target, from a system monitoring mechanism of the computer system, instead of specifying the image of the second file apparatus from a boot firmware, a part configured to include boot information in variables managed by the boot firmware and the system monitoring mechanism, in order to specify the second file apparatus that is the boot target and is managed by the boot firmware by a remote boot specified from the system monitoring mechanism, wherein the boot information includes device path information indicating a location where the second file apparatus is coupled to the computer system, and information related to a file position and a file name of an operating system loader, and wherein the boot firmware and the operating system loader are located into the main memory.

11. The computer-implemented remote boot mechanism as claimed in claim 10, wherein boot information is included not only in NVRAM variables that are managed by a boot firmware but also in system monitoring mechanism remote boot control variables that are managed by the system monitoring mechanism, in order to specify the second file apparatus.

12. The computer-implemented remote boot mechanism as claimed in claim 11, wherein:

the boot information includes a BootXXXX variable, a BootOrder variable, and a BootNext variable, where "XXXX" denotes a hexadecimal number from "0000" to "FFFF", the BootXXXX variable includes the device path information, the BootOrder variable specifies an order in which a plurality of second file apparatuses that are boot targets and indicated by the plurality of BootXXXX variables are to be booted, and the BootNext variable, when it exists, indicates that the second file apparatus specified by the BootXXXX variable indicated by a number set in the BootNext variable is to be booted, regardless of the BootOrder variable.

13. The computer-implemented remote boot mechanism as claimed in claim 12, wherein the BootXXXX variable is modifiable by a boot maintenance tool of the boot firmware only at the NVRAM variables, and non-modifiable at the system monitoring mechanism remote boot control variables.

14. The computer-implemented remote boot mechanism as claimed in claim 12, further comprising:

a part configured to enable a boot specified the remote boot only if all of the BootXXXX variables of the NVRAM variables and the BootXXXX variables of the system monitoring mechanism remote boot control variables perfectly match.

15. The computer-implemented remote boot mechanism as claimed in claim 12, wherein:

the BootOrder variable is modifiable at both the NVRAM variables and the system monitoring mechanism remote boot control variables, the BootOrder variable and the BootNext variable of the system monitoring mechanism remote boot control variables are copied to the NVRAM variables when a remote boot is specified from the system monitoring mechanism and it is confirmed that a coherency of the BootXXXX variables is maintained, and the BootNext variable existing in the NVRAM variables is deleted regardless of whether or not the BootNext variable exists in the system monitoring mechanism remote boot control variables.

16. The computer-implemented remote boot mechanism as claimed in claim 12, wherein:
the BootNext variable is creatable at both the NVRAM variables and the system monitoring mechanism remote boot control variables,
the BootOrder variable and the BootNext variable of the system monitoring mechanism remote boot control variables are copied to the NVRAM variables when a remote boot is specified from the system monitoring mechanism and it is confirmed that a coherency of the BootXXXX variables is maintained, and
the BootNext variable existing in the NVRAM variables is deleted regardless of whether or not the BootNext variable exists in the system monitoring mechanism remote boot control variables.

17. The computer-implemented remote boot mechanism as claimed in claim 12, wherein a remote boot is specified by setting only the BootNext variable, and one of the plurality of second file apparatuses that is the boot target of a next boot process is specified temporarily without modifying the boot information of the NVRAM variables that are managed by the boot firmware.

18. The computer-implemented remote boot mechanism as claimed in claim 12, further comprising:
a part configured to delete the BootNext variable existing in the NVRAM variables after determining the second file apparatus that is the boot target by the boot firmware; and
a part configured to set a number of the BootXXXX variable indicating the determined second file apparatus that is the boot target to a BootCurrent variable that is a memory variable.

19. A computer-readable storage medium which stores a program for causing a computer to carry out a remote boot process, said program comprising:
a procedure causing the computer to load an image of an operating system from a first file apparatus that is coupled to a computer system to a main memory of the computer system and starting the operating system;
a procedure causing the computer to remotely specify an image of a second file apparatus that is coupled to the computer system, as an image of a boot target, from a system monitoring mechanism of the computer system, instead of specifying the image of the second file apparatus from a boot firmware; and
a procedure causing the computer to include boot information in variables managed by the boot firmware and the system monitoring mechanism, in order to specify the second file apparatus that is the boot target and is managed by the boot firmware by a remote boot specified from the system monitoring mechanism,
wherein the boot information includes device path information indicating a location where the second file apparatus is coupled to the computer system, and information related to a file position and a file name of an operating system loader, and
wherein the boot firmware and the operating system loader are located into the main memory.

20. The computer-readable storage medium as claimed in claim 19, wherein said program further comprises:
a procedure causing the computer to include the boot information not only in NVRAM variables managed by the boot firmware but also in system monitoring mechanism remote boot control variables managed by the system monitoring mechanism, in order to specify the second file apparatus.

21. The computer-readable storage medium as claimed in claim 20, wherein:
the boot information includes a BootXXXX variable, a BootOrder variable, and a BootNext variable, where "XXXX" denotes a hexadecimal number from "0000" to "FFFF",
said BootXXXX variable includes the device path information,
said BootOrder variable specifies an order in which a plurality of second file apparatuses that are boot targets and indicated by the plurality of BootXXXX variables are to be booted, and
said BootNext variable, when it exists, indicates that the second file apparatus specified by the BootXXXX variable indicated by a number set in the BootNext variable is to be booted, regardless of the BootOrder variable.

* * * * *

UNITED STATES PATENT AND TRADEMARK OFFICE
CERTIFICATE OF CORRECTION

| | | |
|---|---|---|
| PATENT NO. | : 7,590,838 B2 | Page 1 of 1 |
| APPLICATION NO. | : 11/190970 | |
| DATED | : September 15, 2009 | |
| INVENTOR(S) | : Yukio Oguma | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Twenty-first Day of September, 2010

David J. Kappos
*Director of the United States Patent and Trademark Office*